Nov. 12, 1957            A. MOTTU            2,812,671

AUTOMATIC STOPPING SYSTEM FOR A MACHINE TOOL SLIDE

Filed March 23, 1954            7 Sheets-Sheet 1

Nov. 12, 1957 A. MOTTU 2,812,671
AUTOMATIC STOPPING SYSTEM FOR A MACHINE TOOL SLIDE
Filed March 23, 1954 7 Sheets-Sheet 5

United States Patent Office 2,812,671
Patented Nov. 12, 1957

2,812,671

AUTOMATIC STOPPING SYSTEM FOR A MACHINE TOOL SLIDE

André Mottu, Genthod, Switzerland, assignor to Societe Genevoise d'Instruments de Physique, Canton of Geneva, Switzerland, firm of Switzerland Application March 23, 1954, Serial No. 418,103

Claims priority, application Switzerland April 1, 1953

9 Claims. (Cl. 77—4)

The present invention has for its object a highly accurate machine tool such as a jig boring machine, a boring machine or a grinding machine operating along lines of coordinates, said machine tool being of the type including at least one slide adapted to move over a bench, measuring means adapted to define the different operative positions to be occupied by said slide and a repeating device for said positions, which latter repeating device is constituted by a rotary drum to which are secured adjustable projections, said drum being associated with a control mechanism actuated by said projections with a view to automatically slowing down and stoppage of the slide in the operative positions that have been previously defined.

The measuring means defining the starting positions of the slide may be of different types.

Certain machines are equipped with optical measuring means. These include generally a highly accurate scale and a sighting microscope or a viewing screen, one of said parts, the scale or the microscope being rigid with the movable slide and the other with the bench. The highly accurate scale carries subdivisions at regular intervals and the reference mark cooperating with the microscope may be shifted by amounts equal to predetermined fractions of the interval between two successive subdivisions of the scale. The optical measuring means on such machines are associated with auxiliary scales which are observed by the naked eye and which serve for defining the integer number of subdivisions on the highly accurate scale comprised in the number defining the location of the slide.

When adjusting any position of a slide by means of an optical device, the operator has to perform a series of operations in the following sequence:

(1) Reading of the auxiliary scale in order to bring the slide, by hand or through the agency of an auxiliary mechanism, into the vicinity of the position corresponding to the desired coordinate figure;

(2) Adjustment of the reference mark of the micrometer to the desired fraction of a sub-division;

(3) Observation through the eye-piece of the microscope or on the screen;

(4) Slow shifting of the slide in order to provide inside the microscope for coincidence between the reference mark and the image of a subdivision of the highly accurate scale.

It should be remarked, furthermore, that this series of operations should be repeated at least twice for each position of the slide because, generally speaking, machine tools allow measuring in a system formed by at least two polar or rectangular coordinates, the same steps being required for each coordinate.

When the operator is to machine a series of identical parts, it is of interest to position the slide automatically. If all the positioning adjustments are performed during the machining of the first work and if it is possible, through a suitable mechanism, to find automatically these positions later on, without the operator interfering or with the operator interfering as little as possible, this will mean a considerable saving in time for the latter. On the other hand, the risks of error are reduced by reason of the cutting out of any reading on the auxiliary and highly accurate scales.

The machine tool with the automatic repeating device according to the invention, does not show the drawbacks mentioned hereinabove.

This improved machine is characterized by the fact that the control mechanism includes two juxtaposed push members which move in parallelism with each other under the action of the above mentioned projections in a manner such that if either of said push members according to the direction of movement of the slide occupies a position which differs from its inoperative position, this leads to a slowing-down of the slide and when the push members occupy positions which are symmetrical with reference to the corresponding projections and differ from their inoperative position, as a consequence of a simultaneous movement in opposite directions, this provides a stoppage of the slide.

The main advantages of this invention reside in the ease and accuracy of the initial adjustment of the stopping projection, in the fact that the operation of the repeating device is independent of the direction of shifting of the slide and in the fact that the interference of the operator is very limited, the operator merely turning the drum, so as to position in succession the projections corresponding to the different operations and starting the slide in a direction leading to the desired position of stoppage.

On the other hand, the invention reduces to a minimum the time required for adjustment, because the adjustment of the positions of stoppage may be performed during the machining of the first work of a series. Lastly, it is possible to obtain a high accuracy which depends only on the accuracy of the original adjustment.

Accompanying drawings illustrate by way of example a preferred embodiment of a machine according to my invention. In said drawings.

Figure 5:
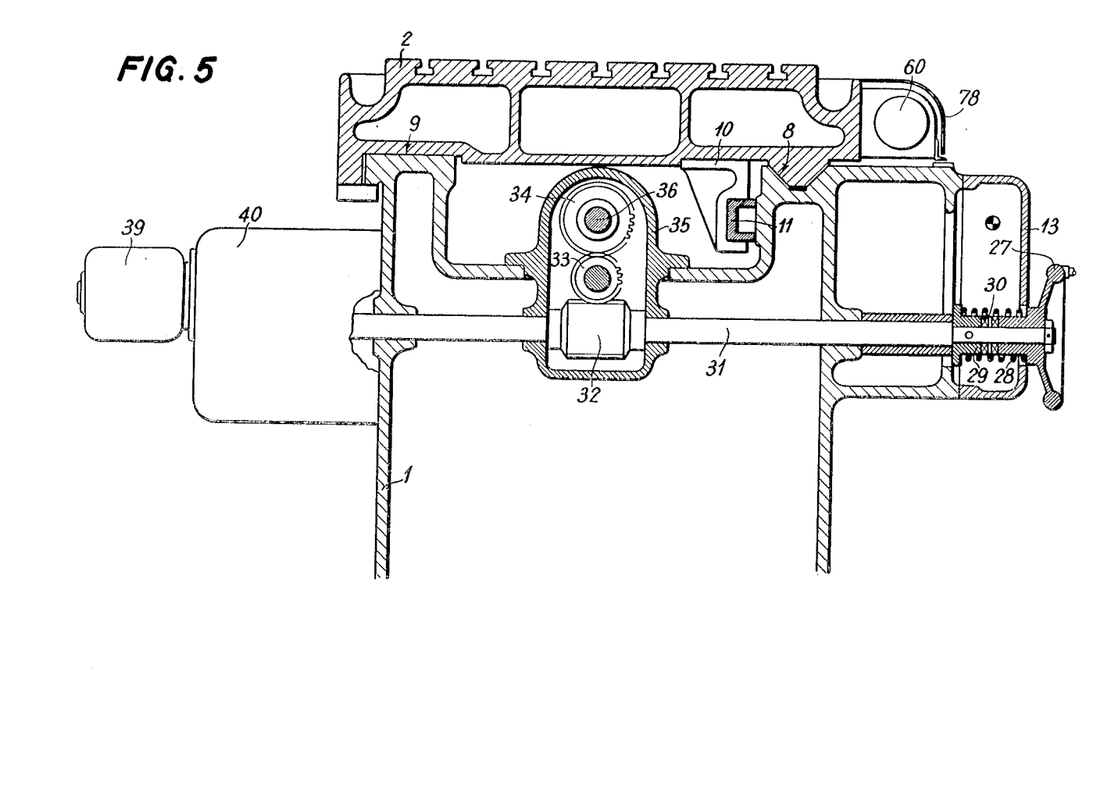
Fig. 5 is a cross-section through line V—V of Fig. 1.

The machine illustrated includes a bench 1 over which moves a slide 2 carrying work 3 to be machined. In the case illustrated, it is desired to machine by means of a drill 4, the perforations 5, 6 and 7 already provided in the work 3. The slide 2 moves over the slideways of which one, 8, is V-shaped while the other, 9, is flat, as shown in Fig. 5. The lower section of said slide carries a support 10 over which is secured a highly accurate scale 11.

Figure 2:
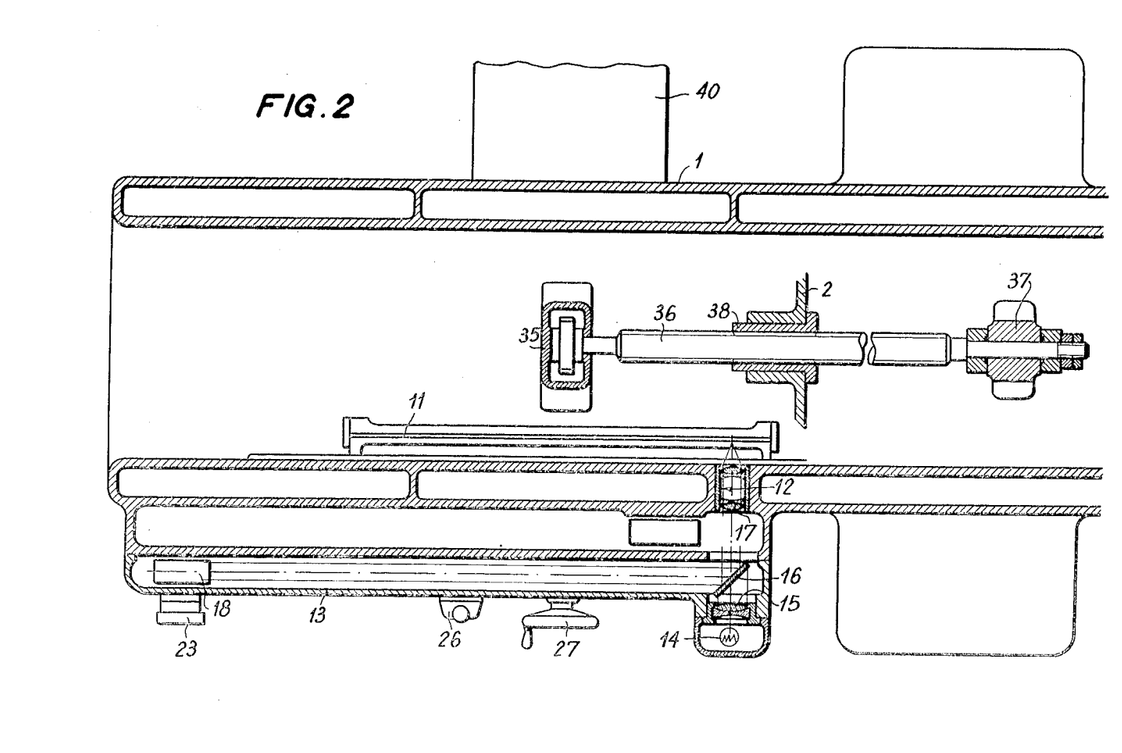
Fig. 2 is a cross-section of the machine through line II—II of Fig. 1.
Figures 3, 4:
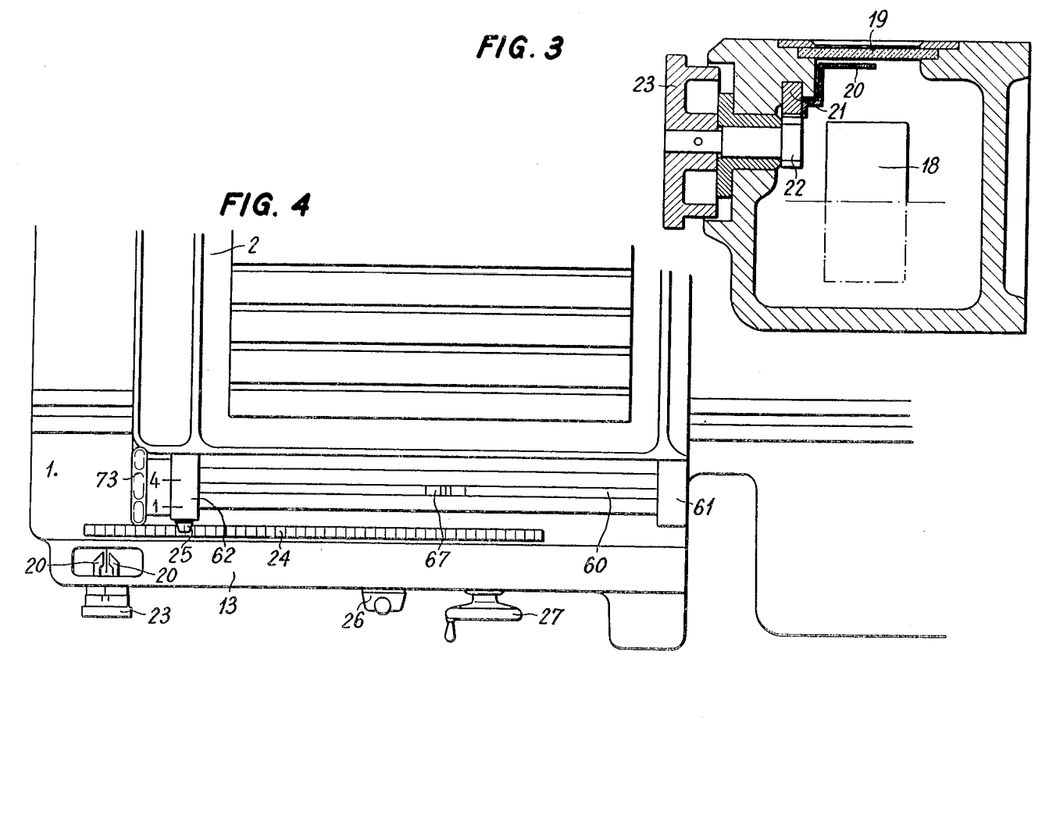
Fig. 3 is a cross-section through line III—III of Fig. 1.
Fig. 4 is a plan view of a portion of the slide of the machine associated with a number of checking and controlling members.

The bench 1 is provided with a perforation 12 through which it is possible to observe the scale 11 from the outside of the machine by means of an optic system enclosed inside a casing 13. Said optic system includes, as shown in Fig. 2, a source of light 14 illuminating the scale 11 through the condenser 15, a semi-transparent mirror 16 and an object glass 17. The scale 11 is made of steel and its surface, subdivided into millimetric intervals, is polished so as to reflect the luminous beam. The latter is deflected by the semi-transparent mirror 16 so as to impinge on a mirror 18 and on a screen 19 (Fig. 3). The reference marks 20 are mounted so as to be shiftable in front of the screen 19. These reference marks are secured to a rack 21 meshing with a pinion 22 rigid with a scale-carrying drum 23. When the drum is caused to revolve by one revolution, the reference marks 20 are shifted by a distance equal to that separating two successive subdivisions of the scale 11. Thus, the difference between two subdivisions being assumed to be equal to 1 mm. and supposing the drum is subdivded into 100 peripheral scale elements, and cooperates with a vernier carrying ten subdivisions, it is possible to read the position of the slide 2 with an accuracy of $\frac{1}{1000}$ of a millimeter. The bench also carries an auxiliary scale 24 (Fig. 4) which allows, through cooperation with a pointer 25 rigid with the slide 2, to define roughly the location of the latter. This optical measuring system allows finding the initial positions which are to be occupied by the slide during the machining of a series of parts.

The casing 13 carries, furthermore, a lever 26 controlling the electric motor 39 which actuates in its turn the slide 2 as described hereinafter. The accurate adjustment of the position of the slide is obtained by hand by means of a hand-wheel 27 which, when urged axially against the thrust exerted by the return spring 28 (Fig. 5) is coupled with a sleeve 29 through a dog-clutch. Said sleeve 29 is rigid with a shaft 31 carrying a worm 32 controlling, through the agency of interengaging wheels 33 and 34 mounted inside a casing 35, a lead-screw 36 (Fig. 5). This lead-screw revolves on one hand inside the casing 35 and, on the other hand, inside a thrust bearing 37 secured to the bed 1 of the machine (Fig. 2). The lead-screw 36 is screwed inside a nut 38 rigid with the slide 2. In order to drive the slide by means of a power unit, the shaft 31 is adapted to be driven by a motor 39 with the interposition of a change speed gear 40 (Fig. 5).

Figures 6, 8:
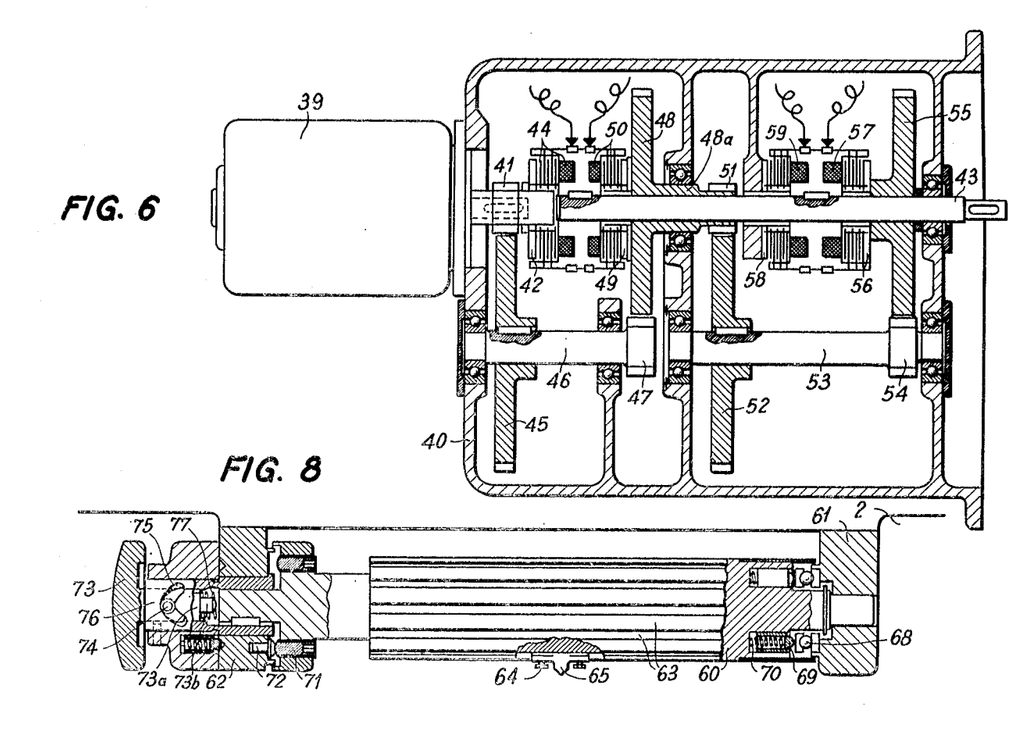
Fig. 6 is a sectional view of a detail illustrating the power-controlled slide-actuating means together with the clutches which allow reducing the speed and locking the slide actuating means.
Fig. 8 is a partly sectional view of a further detail of the repeating device.

This change speed gear illustrated cross-sectionally in Fig. 6 is provided with electrically operated clutches. It includes a first pinion 41 which is permanently driven by the motor 39 and is rigid with a set of clutch discs 42. These discs may be electrically controlled so as to engage the output shaft 43 of the change speed gear by an electro-magnetic clutch control 44. The motor 39 is then in direct drive relationship with said output shaft 43, which leads to a maximum speed of progression for the slide 2.

The above mentioned pinion 41 meshes permanently with a toothed wheel 45 rigid with a shaft 46 carrying in its turn a pinion 47. The latter is in permanent engagement with a wheel 48 mounted loose on the output shaft 43 and carrying a set of clutch discs 49. Said wheel 48 may be rigidly connected with the shaft 43 through the agency of an electric clutch control 50. The pinions 41, 45, 47 and 48 form a gearwork adapted to reduce the speed of the output shaft 43. The hub 48a of the wheel 48 carries a pinion 51 which is in permanent engagement with the toothed wheel 52 rigid with an intermediate shaft 53 carrying a pinion 54 meshing with a wheel 55 mounted loose on the output shaft 43 and carrying rigidly a set of clutch discs 56. It is possible by means of the electric clutch-controlling means 57 to couple the wheel 55 with the output shaft 43. The pinions and wheels 52, 54, 55 form a second gearwork which is adapted to reduce to a still greater extent the speed of rotation of the output shaft 43.

Furthermore, the change speed gear includes a set of stationary clutch discs 58 controlled by the electric clutch-controlling means 59 providing for engagement between said discs and cooperating discs on the output shaft 43 with a view to locking the latter against rotation.

The machine also includes a repeating device for returning the slide 2 into the original position occupied by it at the moment of the machining of the first work of a series without it being necessary to resort again to the optic adjusting means.

Figure 1:
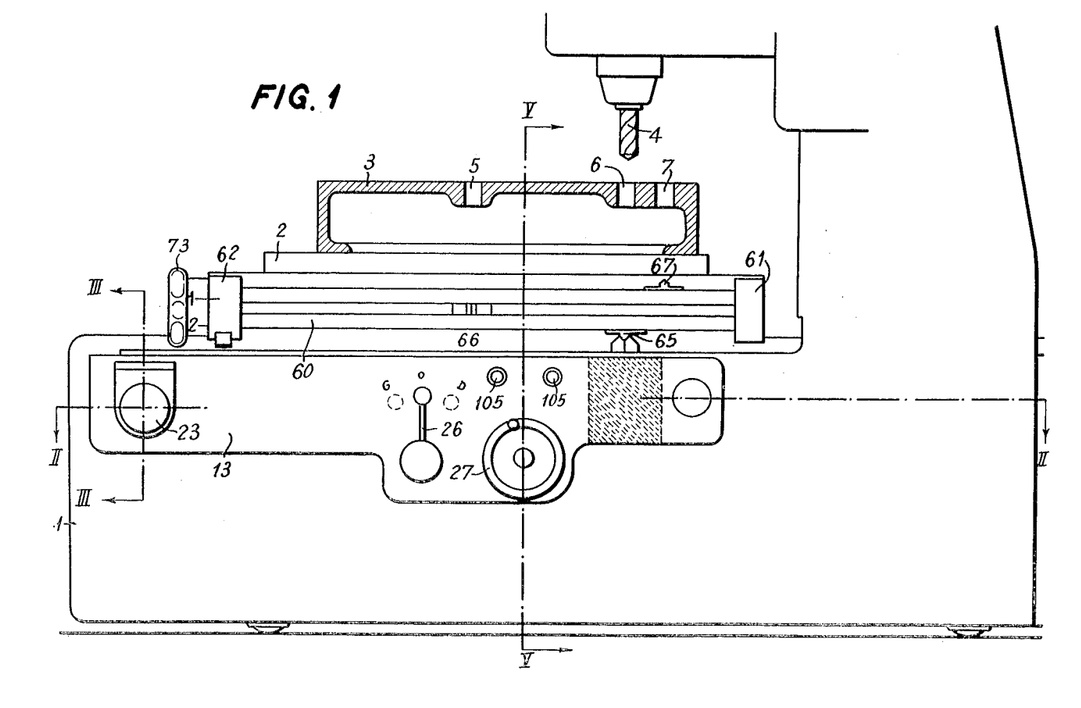
Fig. 1 is an elevational view of a jig boring machine the coordinates of which are controlled optically, the work being shown cross-sectionally.

This repeating device includes a drum 60 adapted to revolve inside the bearings 61 and 62 secured to the slide 2. Said drum is provided with a series of longitudinally extending grooves 63 the cross-sections of which are dove-tailed (Figs. 1 and 8). Inside said grooves, corresponding projections 65, 66, 67 may be secured by means of screws 64. The drum 60 cooperates on its right hand end as shown in Fig. 8 with a thrust bearing 68 which is engaged by push-members 69 submitted to the action of the springs 70 which urge thus the drum away towards the left hand side of Fig. 8. At its left end, said drum carries a series of longitudinally extending adjustable screws 71, the number of which corresponds to that of the grooves 63 and which engage in succession, during the rotation of the drum, a stationary abutment 72 secured to the bearing 62. Lastly, the drum is provided with a coaxial rotary knob 73 rigid with a rod 73a terminating with a push member 73b. The rod 73a carries a roller 74 the axis of which is radial with reference to the rod and which passes through a V-shaped slot 75 formed in the sleeve 76 rigid with the drum 60. The rotation of the knob 73 constrains the push member 73b to assume an axial movement towards the drum so as to push the latter back against the action of the return springs 70 and to urge away from the abutment 72 that screw 71 with which it is then in contacting relationship; by further rotating the knob 73, the roller 74 reaches the end of the groove 75, and drives in its turn the drum 60 through the sleeve 76 and the key 60a. When the knob 73 is released, the push member 73b is returned into its original longitudinal position by a return spring 77 and the roller 74 returns into its position illustrated in Fig. 8; a further screw 71 enters then into contacting relationship with the stop 72.

By screwing more or less the different screws 71, it is possible to adjust the axial position of the drum in each of its corresponding angular positions, the number of said angular positions being equal to that of the grooves 63 formed longitudinally of the drum.

The drum is covered by a protecting casing 78 which prevents the shavings from engaging the grooves or the projections on the drum or from entering the mechanism adjusting and controlling the position of the slide, illustrated in Fig. 5.

The projections fitted inside the grooves 63 have for their object to produce a repetition of or a return into the original position assumed by the slide during the machining stage. These projections act on a control mechanism or micrometric circuit-breaker illustrated in Fig. 7, said circuit-breaker being adapted to control the electric circuits feeding the electro-magnetic control means for the clutches of the change speed gear and also the operation of the motor.

Figures 7, 9, 10, 11, 12, 13, 14, 15, 16:
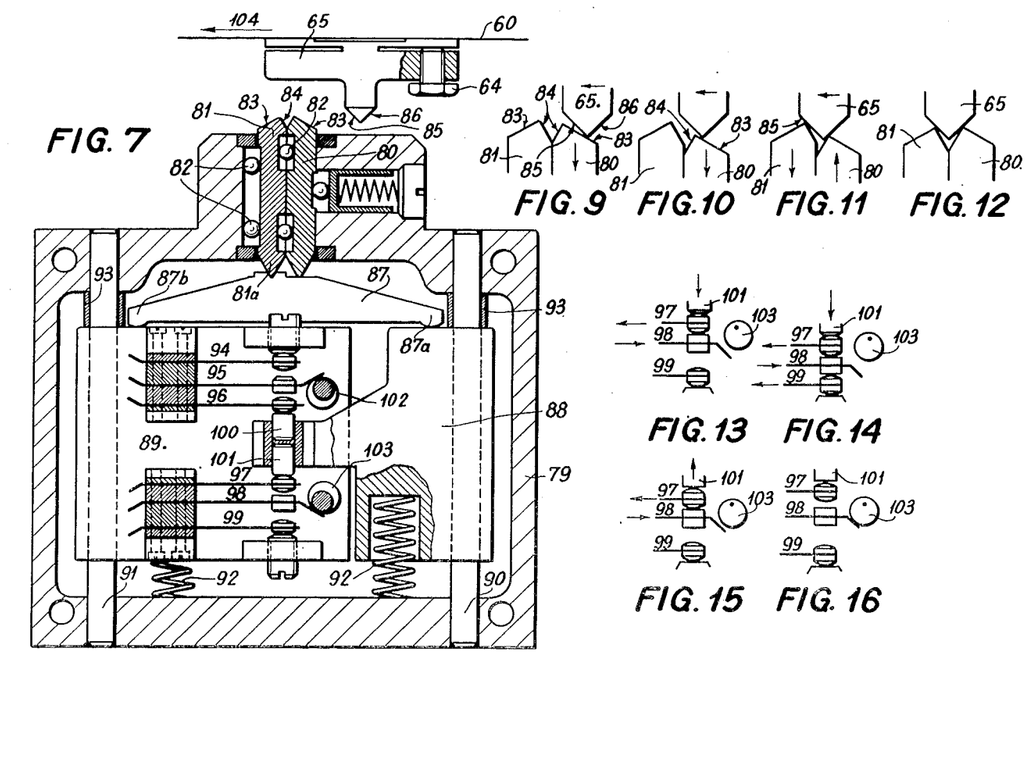
Fig. 7 is a cross-sectional view of a detail of the repeating device.
Figs. 9, 10, 11 and 12 illustrate four different positions of the push members and of the cooperating movable projection to which positions correspond respectively the four positions of the contact-pieces illustrated in Figs. 13, 14, 15 and 16.

The micrometric circuit-breaker is carried inside a casing 79 which is provided with two push-members 80 and 81 lying in juxtaposed relationship and held in position by balls so as to be capable of sliding axially without any friction, either singly or together. Each push-member is provided with two asymmetrical sloping surfaces 83 and 84, the surfaces 84 on the two push-members facing each other. Each projection on the drum 60 is provided at its outer end with two sloping surfaces 85 and 86 located symmetrically with reference to the axis of the projection. When the slide 2 and consequently the drum 60 are shifted longitudinally, one of these projections acts on the push members 80 and 81 so as to shift them axially. These push members transmit the thrust produced by the passage of the projection to a swing bar 87 the central part of which is engaged by said push members, while one of the outer ends 87a of the swing bar rests on a sliding carrier 88 and its other end 87b rests on another sliding carrier 89. The two carriers 88 and 89 slide respectively over two guiding rods 90 and 91 which extend in parallelism with the sliding axes of the push members 80 and 81. Each sliding carrier is urged upwardly by a coil spring 92 and its upward path is limited by a ring 93 fitted over the corresponding guiding rod.

The carrier 89 is provided with two sets of yielding blades 94, 95, 96 on one hand and 97, 98, 99 on the other hand, said blades being electrically insulated and inserted in the electric circuits controlling the power-driven operation of the slide. The carrier 88 is provided with two stops 100 and 101 which are electrically insulated and against which the blades 96 and 97 are urged respectively when they are inoperative, as in the case illustrated in Fig. 7. The blades 95 and 98 are adapted to feed current to the blades 94 and 96 or 97 and 99 respectively, according to the location assumed by the associated stops 100 and 101. The carrier 89 is further provided with two eccenters 102 and 103 cooperating with the ends of the corresponding blades 95 and 98 respectively and adapted to adjust the position of the latter, when inoperative, with reference to the other blades.

The operation of this micrometric circuit-breaker is illustrated in Figs. 9 to 16 in which the arrows show the directions along which the different parts are being shifted and also the direction of flow through the electric circuits. When the slide is stationary in any stopping position prior to the starting of the machining operation, the lead screw 36 is locked by the brake 59 in the change speed gear (Fig. 6) acting on the output shaft 43. The lever 26 occupies then its neutral position O illustrated in Fig. 1. It is then sufficient to push the lever 26 into the desired position G or D so as to start the motor 39 in either direction, to release the brake 59 and to energize the clutch control means 44, whereby a high speed of progression of the slide in the desired direction is obtained.

When a projection, such as the projection 65 shown in Fig. 7, moves in the direction of the arrow 104 and engages one of the push members of the circuit breaker, in the present case the push member 80, said projection shifts the push-member downwardly as illustrated in Figs. 9 and 10 and this push-member acts on the swing bar 87 which rocks round its end 87b; consequently, the swing bar urges downwardly the sliding carrier 88. The stop 101 on said carrier pushes downwardly the blade 97 so that the latter engages the blade 98 (Fig. 13) and modifies the electrical connections. This de-energizes the clutch 44 and energizes the clutch 50, whereby a considerable slowing down of the slide is obtained. At the same time, a tell-tale lamp 105 is illuminated (Fig. 1) and the control lever 26 is returned into its neutral position O without the motor stopping.

The projection 65 continues now progressing and as it still engages the sloping surface 83 of the push member 80, it shifts the latter further down until the stop 101 on the sliding carrier 88 has depressed both the blades 97 and 98 and has brought the latter into contacting relationship with the blade 99 (Fig. 14). The part played by this switch 98—99 will be disclosed hereinafter with further detail.

The projection 65 rides now over the ridge separating the sloping surfaces 83 and 84 of the push member 80 so that the latter rises back towards its starting position. At the same time, the sloping surface 85 on the projection acts on the ridge of the push member 81 so as to urge the latter downwardly (Fig. 11). This produces a simultaneous movement of the two push members in opposite directions, which movements are transmitted to the sliding carriers 88 and 89, the swing-bar pivoting at this moment round the lower end 81a of the push member 81. When the blade 98 releases the blade 99 (Fig. 15) by reason of the upward movement of the sliding carrier 88, this provides a disengagement of the clutch 50 and the engagement of the clutch 57; consequently, the slide progresses at its lowest speed.

When the projection 65 engages exactly the gap between the two push members (Fig. 12), the blade 97 releases the blade 98 (Fig. 16) and since the control lever 26 has returned in the meantime into its neutral position O, the motor stops and the clutch 59 is again operative so as to lock the lead screw and thereby the slide 2.

Since the sliding carriers 88 and 89 move simultaneously in opposite directions, the breaking of the circuit between the contact blades 97 and 98 may be obtained by a very small shifting of the projection 65, which increases the accuracy of the stoppage. It should be remarked that for this position, both push-members are slightly lower than in their inoperative position, this being a consequence of the simultaneous movements assumed by them in opposite directions.

In the example illustrated, the slide and the projection move from the right hand side to the left hand side of Fig. 7 and of Figs. 9 to 12, but their operation is similar when they move in the opposite direction from the left hand side to the right hand side. The same operations are performed in succession, but in this case, the blades 94, 95 and 96 are operative and work with the above mentioned set of blades 97, 98 and 99.

Figure 17:
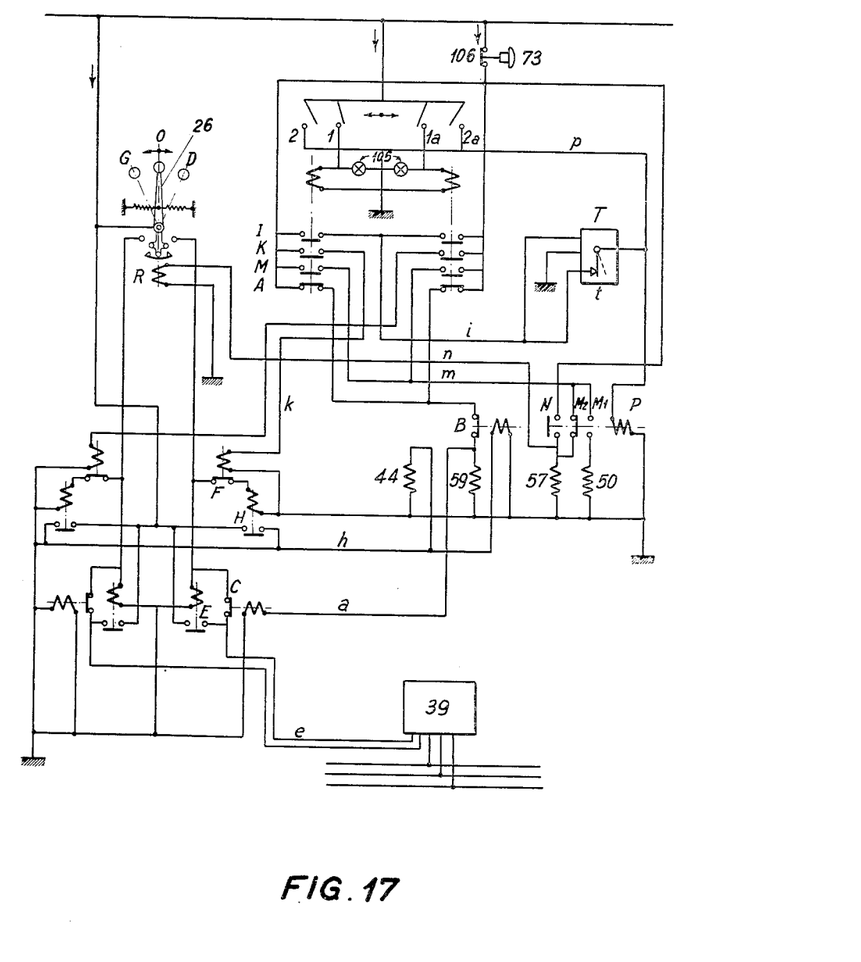
Fig. 17 is a wiring diagram of the machine.

The wiring diagram of Fig. 17 shows the operation of the micrometric circuit-breaker acting on the various control circuits for the motor 39 and the electrically controlled clutches of the change speed gear 40.

The position illustrated in Fig. 17 for the different parts of the wiring diagram corresponds to any inoperative position of the slide for which none of the projections is in contact with the push members 80 and 81. The control lever 26 of the motor 39 is in its neutral position, the motor is at a standstill and the switches A and B are closed and energize the electromagnetic means controlling the locking clutch 59 through the circuit a which opens, on the other hand, the switch C.

When positioning the lever 26 on the left hand position G for instance, this closes the switch E in the control circuit e so that the motor 39 starts revolving in the direction corresponding to a shifting of the slide 2 towards the left. At the same time, the switch H is closed by the associated energizing coil and the circuit h opens on one hand the switch B so as to release the clutch 59 which was holding the power control locked and, on the other hand, a shunt energizes the control of the clutch 44 so as to make the slide move at its higher, work-nearing speed.

When the projection 65 reaches the push-member 80 and begins urging it downwardly, as shown in Fig. 9, the blade 97 engages the blade 98 (Fig. 13) and the contact-piece 1 in the wiring diagram is fed so as to energize a coil opening the switch A and closing simultaneously the switches I, K, M, while the tell-tale lamp 105 corresponding to the direction of movement of the slide is ignited.

The contact-piece t of the delayed contact-maker T being closed, the circuit i acts on the relay P which closes the switches M–1 and N and opens the switch M–2. On the other hand, the circuit k acts on the relay F so as to switch off current from the circuit h. Consequently, the clutch 44 is released and the clutch 50 becomes operative so as to produce a first slowing-down of the speed of the slide. Furthermore, the circuit n, also closed, acts on the electromagnet R so as to release the automatic locking of the lever 26 which is returned into its neutral position by a return spring.

The push member 80, continuing its downward movement, reaches the end of its stroke, as shown in Fig. 10, and the blade 98 engages the blade 99 (Fig. 14). The contact-piece shown at 2 in the diagram closes and establishes a circuit $p$ which serves to hold the circuit through P closed, as a substitute for that $i$ precedingly closed, when the contact-piece $t$ in the contact-maker T opens. The said contact-piece is adjusted so as to open before the push member 80 begins its upward return movement.

When the projection 65 has passed beyond the edge of the push member 80, the latter, which is urged by the swing bar 87 and by the spring 92, rises while the push-member 81 which is engaged by the projection 65, is urged downwardly (Fig. 11). This provides for disengagement between the blades 98 and 99 (Fig. 15). The circuit $p$ is thus broken and the relay P is no longer energized. Consequently, the clutch 50 is released, while the clutch 57 is energized, thereby producing a second slowing-down of the speed of the slide. At the same time, the circuit $n$ opens, which returns the locking means R for the lever 26 into their starting position.

The opposite parallel movements of the two push-members 80 and 81 continue and stop exactly when the push members reach positions which are symmetrical to either side of the plane separating them as shown in Fig. 12. By suitably adjusting the eccenter 103, it is possible to obtain at this moment a spacing between the blades 97 and 98 (Fig. 16) which corresponds in the wiring diagram to an opening of the contact piece 1. The circuit $m$ being broken, the clutch 57 corresponding to a very low speed is released. The circuit $a$ closes again which energizes the clutch 59 and locks the power control while it opens the switches C and E so as to break the control circuit $e$ and to produce a stoppage of the motor 39. On the other hand, the circuit $k$ is no longer fed and the switch F returns into its closed position. The circuit $i$ being open, it no longer feeds the delayed switch T so that the contact-piece $t$ returns into its original position. The tell-tale lamp 105 is extinguished which shows that the operative position of the slide is actually reached. In order to reach the next operative position, it is necessary to release the projection 65 with reference to the two push members 80, 81 by acting on the knob 73 of the drum 60. The switch 106 is provided for deenergizing the micrometric circuit-breaker while the projection is being released. Said switch is controlled by the axial movement of the knob 73, as produced at the beginning of its rotation in either direction.

The same operations are performed in an exactly similar manner with the contact pieces 1a and 2a when the shifting of the slide is performed towards the right hand side and the projection 65 meets first the push member 81.

Obviously the electric change speed gear illustrated in Fig. 6 may be replaced by a speed-varying device of any known or suitable type, whether mechanical, hydraulic or the like.

The operator makes the machine work in the following manner:

After he has secured the first work of the series to be machined on the slide 2, the operator defines the location of the first working position in accordance with the coordinates which have been prescribed to him, this location being performed by means of the optic measuring means.

After locking the slide in the position thus defined, the operator makes the spindle of the machine start so as to provide for the corresponding machining such as a boring or a drilling. During the machining, he brings one of the projections 65–66 etc. of the drum 60 between the push-members 80 and 81 of the micrometric circuit breaker. He locks the selected projection in position and then defines the accurate axial position of the drum 60 by an accurate adjustment of the corresponding screw 71, this adjustment being obtained by means of the two tell-tale lamps 105 which should remain obscure.

The operator then proceeds in succession with the location of each working position in the manner disclosed and when the machining of the first work is at an end, the repeating device is ready to operate for the following pieces of work.

Whatever may be the position of the slide 2, it is sufficient to make the rotary drum 60 revolve so as to set it in the position corresponding to the machining to be performed and to shift the lever 26 in the desired direction, whereby the slide engages automatically and is held in the position occupied by it during the machining of the first piece of work.

The operation of the repeating device is such that the stopping position obtained does not depend on the direction of displacement of the slide and consequently it is possible to modify as desired the sequence of the different machining steps. This may be of considerable interest in many cases, in particular when several operations are to be executed with the same tool.

It is also possible, for instance, with a view to cutting a key-way closed at both ends to position two projections in the same groove of the rotary drum, said projections defining the two extreme positions to be assumed by the cutter. The latter being at one extreme position, the knob 73 should receive a short push, so as to actuate the switch 106 and to deenergize the micrometric circuit breaker, which allows shifting the slide into the other extreme position by actuating the lever 26 in the desired direction.

Obviously, a reverse arrangement may be used wherein the drum and the projections are carried by the machine bed and the micrometric circuit-breaker by the moving slide.

What I claim is:

1. In a machine tool comprising a frame provided with a rectilinear slideway, a slide adapted to move in both directions along said slideway, a tool carried by one of the following parts, the frame and the slide, means for securing a work to the other of said parts, electromagnetically controlled clutches, and electric circuits controlling said clutches, and through which the motor is adapted to control the progression of the slide along the slideway, the provision of a repeating device adapted to stop automatically the slide in one of a number of predetermined operative positions, said repeating device comprising an angularly adjustable drum the axis of which is parallel with said slideway of the frame, a plurality of projections the outer operative end of each of which forms a solid dihedral and adapted each to be longitudinally adjusted in position along a corresponding generating line of the drum, a control body, two juxtaposed pusher members shiftably mounted in said body and adapted to move along parallel lines in directions radial with reference to the axis of the drum and lying in a common radial plane, the outer ends of said pusher members forming together a reentrant dihedral, means for shifting translationally in unison with the slide one of the following parts: the rotary drum and the body carrying the pusher members, means for securing the other part in a predetermined position on the frame, two supports adapted to slide with reference to the body carrying the pusher members in the same direction as and under the action of the pusher members, away from the axis of the drum, means urging the sliding supports and therewith the pusher members back towards the axis of the drum, a plurality of switches carried by at least one of the sliding supports and adapted to control the electric circuits in the change speed gear to obtain selectively high speed, two lower speeds and a holding fast of the slide, means wherethrough the switches are controlled by the relative position of the sliding supports when the latter are submitted to the thrust of the pusher members depressed by the passage over them of the projection in a generating line of the drum lying in the above mentioned plane of movement of the pusher members, said passage being provided by the movement of the slide and consequent relative sliding movement of the drum with reference to the body, said projection first engaging the pusher member facing its direction of travel to control the switches through one sliding support to produce a slowing down of the slide to a first slow speed and the further progression of said projection modifying the control of the switches to produce a further slowing down of the slide to the second low speed and the final engagement of the solid dihedral of the projection with the reentrant dihedral of the pusher members producing a simultaneous depression of the two pusher members to an extent such as will operate the switches and hold the slide fast in the desired operative position corresponding to the location assumed by the projection in the generating line of the drum facing the pusher members when thus engaged by the reentrant dihedral between the latter.

2. In a machine tool comprising a frame provided with a rectilinear slideway, a slide adapted to move in both directions along said slideway, a tool carried by one of the following parts, the frame and the slide, means for securing a work to the other of said parts, an electric motor, a change speed gear, including electromagnetically controlled clutches and electric circuits controlling said clutches, and through which the motor is adapted to control the progression of the slide along the slideway, a highly accurate scale and a cooperating magnifying optic system carried respectively by one of the following parts, the frame and the slide, to allow defining a number of selected operative positions to be occupied by the slide for the machining of the work by the tool, the provision of a repeating device adapted to stop automatically the slide in a predetermined operative position, said repeating device comprising an angularly adjustable drum the axis of which is parallel with said slideway of the frame, a plurality of projections the outer operative end of each of which forms a solid dihedral and adapted each to be longitudinally adjusted in position along a corresponding generating line of the drum, a control body, two juxtaposed pusher members shiftably mounted in said body and adapted to move along parallel lines in directions radial with reference to the axis of the drum and lying in a common radial plane, said pusher members having their outer ends facing the drum constituted each by two outwardly convergent sloping terminal planes meeting each other along a line perpendicular to the radial plane of movement of the pusher members, the inner terminal planes of the pusher members which face each other having a greater slope with reference to the axis of the drum than the outer planes and forming together a reentrant dihedral which is more acute than the solid dihedral of the projection, means for shifting translationally in unison with the slide one of the following parts: the rotary drum and the body carrying the pusher members, means for securing the other part in a predetermined position on the frame, two supports adapted to slide with reference to the body carrying the pusher members in the same direction as and under the action of the pusher members away from the axis of the drum, means urging the sliding supports and therewith the pusher members back towards the axis of the drum, a plurality of switches carried by at least one of the sliding supports and adapted to control the electric circuits in the change speed gear to obtain selectively a high speed, two lower speeds and a holding fast of the slide, means wherethrough the switches are controlled by the relative position of the sliding supports, the projection advancing towards the pusher members under the action of the movement of the slide impinging first on the outer terminal plane of one pusher member to depress it and to actuate thereby the switches in the sliding supports to slow down the slider to the first low speed and the subsequent engagement of the dihedral on the projection with the ridge of the second pusher member, while still in contact with the first mentioned pusher member to hold it depressed to a smaller extent, acting on the switches in the sliding supports to bring the slide to its second low speed and the solid dihedral, when finally occupying a position symmetrical with reference to the pusher members in register with the reentrant dihedral, depressing the pusher members simultaneously into positions for which they actuate the switches to hold the slide fast exactly in the position defined by the interengagement of the solid and reentrant dihedrals.

3. In a repeating device for a machine tool as claimed in claim 2, the provision of means rigidly securing the body to the frame, means for shifting longitudinally the rotary drum in unison with the slide, and means for setting the drum selectively in one of a plurality of angular positions for which the generating lines of the drum registering with the different projections lie in the radial plane of movement of the pusher members.

4. In a repeating device for a machine tool as claimed in claim 2, the provision of pusher members having each a terminal plane, said terminal planes being arranged symmetrically with reference to a plane of symmetry perpendicular to the direction of progression of the slide when said pusher members are in their released inoperative positions.

5. In a repeating device for a machine tool as claimed in claim 2, the provision of a plurality of parallel blades forming the switches and carried by one sliding support and adapted to engage one another operatively according to the relative movement of the sliding supports with reference to each other.

6. In a repeating device for a machine tool as claimed in claim 2, the provision of a floating swing-bar the medial part of which is subjected to the action of the pusher members at two points located near each other and the outer ends of which engage the sliding supports and urge them selectively away from the axis of the drum when the corresponding pusher member is urged downwardly against said swing-bar.

7. In a repeating device for a machine tool as claimed in claim 2, two series of yielding blades forming the switches and carried by one of said sliding supports and corresponding each to one direction of progression of the slide, switch-operating members rigid with the other sliding support and located between the two series of switches in the first support, the relative shifting of the second support with reference to the first support in a direction depending on the direction of progression of the slide producing the successive closing of the switches of the series corresponding to said direction of progression of the slide to obtain in succession a high speed, two lower speeds and a stoppage of the slide, the passage of a projection carried on a generating line of the drum lying in said plane of movement of the pusher members onto and over the pusher member facing its direction of travel producing the sequential operation of the switches.

8. In a repeating device for a machine tool as claimed in claim 2, the provision of means rigidly securing the body to the frame, means for shifting longitudinally the rotary drum in unison with the slide, terminal stub shafts coaxially rigid with the ends of the drum, bearings rigid with the slide and housing with a slight axial clearance the last mentioned stub shafts, axial cooperating stops carried by one end of the drum and by the cooperating bearings, means urging yieldingly the drum into a position for which the stops engage each other, micrometric screws rigid with the drum and extending longitudinally thereof at points of its periphery and distributed in accordance with the distribution of the generating lines guiding the projections, a hard surface rigid with the slide adapted to be engaged by the micrometric screw corresponding to the generating line of the drum facing a predetermined direction to provide a highly accurate adjustment of the axial position of the rotary drum with reference to the slide in the angular setting for which said corresponding generating line registers with predetermined direction.

9. In a repeating device for a machine tool as claimed in claim 2, the provision of means rigidly securing the body to the frame, means for shifting longitudinally the rotary drum in unison with the slide, means for adjustably shifting axially within a small range of movement the location of the drum.

References Cited in the file of this patent

UNITED STATES PATENTS

| | | |
|---|---|---|
| 395,592 | Schwarzler | Jan. 1, 1889 |
| 2,000,553 | Alden | May 7, 1935 |
| 2,042,379 | Barnes et al. | May 26, 1936 |
| 2,350,174 | Lucas et al. | May 30, 1944 |
| 2,370,222 | Bennett et al. | Feb. 27, 1945 |
| 2,391,487 | Snader | Dec. 25, 1945 |
| 2,483,712 | Schafer | Oct. 4, 1949 |

FOREIGN PATENTS

| | | |
|---|---|---|
| 696,962 | Germany | Oct. 3, 1940 |